(12) United States Patent
Amutham

(10) Patent No.: US 8,587,222 B2
(45) Date of Patent: Nov. 19, 2013

(54) ENERGY SAVER FOR AREA LIGHTS

(75) Inventor: Velayutham Kadal Amutham, Chennai (IN)

(73) Assignee: Empire Technology Development LLC, Wilmington, DE (US)

( * ) Notice: Subject to any disclaimer, the term of this patent is extended or adjusted under 35 U.S.C. 154(b) by 1114 days.

(21) Appl. No.: 12/550,473

(22) Filed: Aug. 31, 2009

(65) Prior Publication Data

US 2010/0264853 A1    Oct. 21, 2010

(30) Foreign Application Priority Data

Apr. 15, 2009    (IN) .............................. 863/CHE/2009

(51) Int. Cl.
    *H05B 37/02*    (2006.01)
(52) U.S. Cl.
    USPC ........... 315/308; 315/152; 315/155; 315/360; 340/936; 340/937

(58) Field of Classification Search
    USPC ......... 315/129, 130, 149, 150, 152, 155, 308, 315/360; 340/531, 539.22, 539.3, 309.16, 340/933, 936, 937
    See application file for complete search history.

(56) References Cited

U.S. PATENT DOCUMENTS

| 7,855,376 B2 * | 12/2010 | Cantin et al. ............. 250/559.29 |
| 2009/0262189 A1 * | 10/2009 | Marman ....................... 348/143 |
| 2010/0141153 A1 * | 6/2010 | Recker et al. ................. 315/149 |

* cited by examiner

*Primary Examiner* — Thuy Vinh Tran
(74) *Attorney, Agent, or Firm* — Brundidge & Stanger, P.C.

(57) ABSTRACT

Saving energy includes at least one object sensor that is coupled to at least one light sensing if at least one object is present adjacent to the at least one light. If it is further determined that the time of day corresponds to a desired start-up time, the at least one light may then be illuminated by a control system.

23 Claims, 5 Drawing Sheets

ENERGY SAVER FOR AREA LIGHTS

CROSS-REFERENCE TO RELATED APPLICATIONS

This application claims the benefit and priority of India Application Serial No. 863/CHE/2009, filed Apr. 15, 2009. The entire disclosure of the above application is incorporated herein by reference.

TECHNICAL FIELD

The present application relates to an energy saving system, and particularly to a method and apparatus for saving energy used by street or area lights.

BACKGROUND

Most areas, rural or urban, include at least one street light adjacent to a street. Generally, the street light can be employed to illuminate the street after daylight hours. In certain instances, during late evening and/or early morning hours, the traffic on the street, human or vehicular, may be minimal.

SUMMARY

In one example, a method of saving energy is provided. The method can include providing at least one object sensor coupled to at least one light, and sensing if at least one object is present adjacent to the at least one light. The method can further include determining if the time of day corresponds to a desired start-up time, and illuminating the at least one light if the time of day corresponds to the desired start-up time and the at least one object is adjacent to the at least one light.

Also provided, according to one of various examples, is a system for saving energy. The system can include at least one object sensor. The at least one object sensor can sense the presence of at least one object. The system can include at least one control system that can determine, based on the presence of the at least one object, whether to illuminate an area around the at least one object sensor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
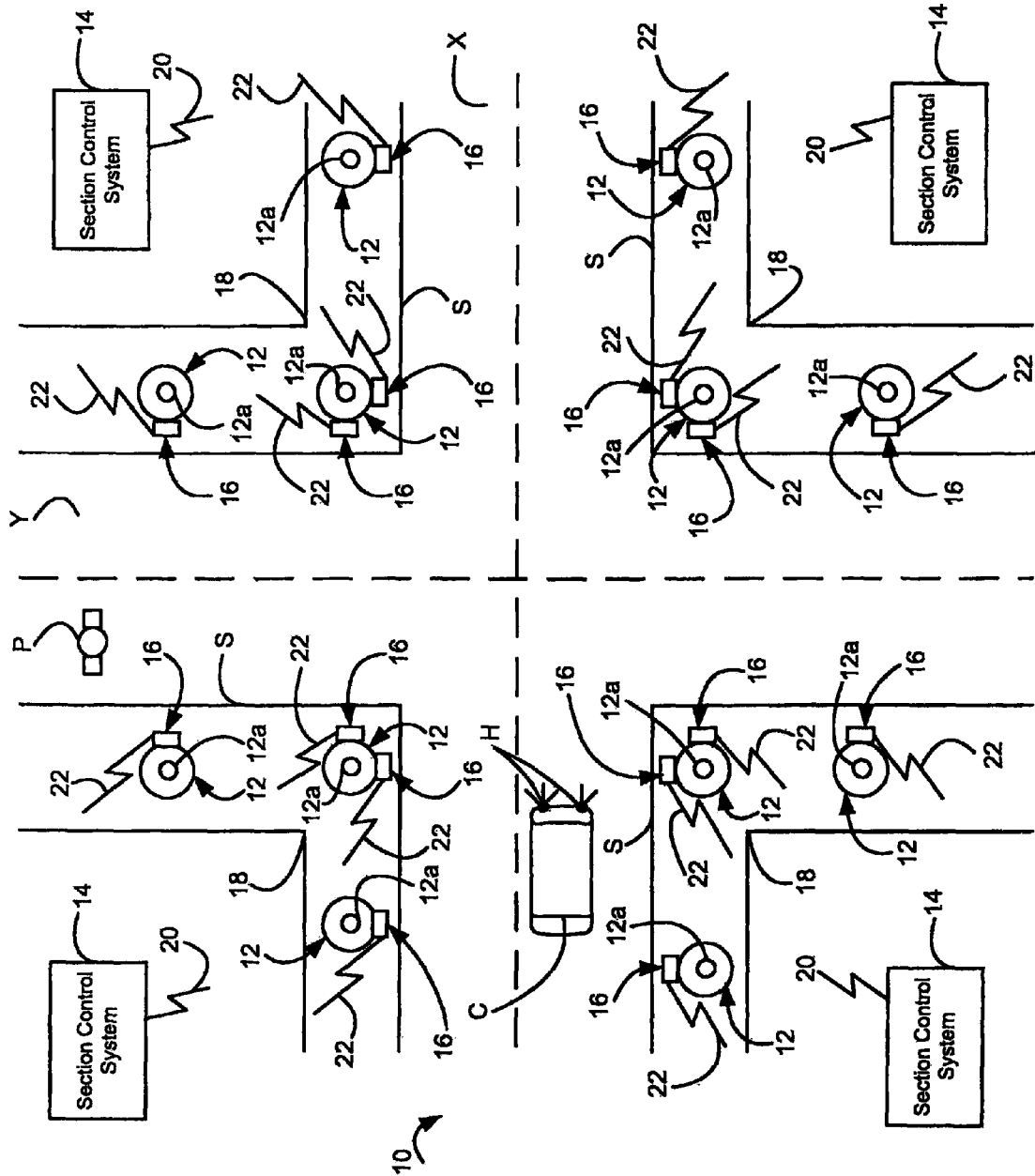
FIG. 1 is a schematic of an energy saver system for street lights according to various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

EXAMPLES

As indicated above, the present teachings are directed toward providing a system and method for saving energy for use with street lights. It should be noted, however, that the present teachings could be applicable to any appropriate procedure in which it is desirable to save energy and operating costs, such as in an office building. Further, as used herein, the term "module" can refer to an application specific integrated circuit (ASIC), an electronic circuit, a processor (shared, dedicated, or group) and memory that executes one or more software or firmware programs, a combinational logic circuit, and/or other suitable hardware or software, firmware programs or components that provide the described functionality. Therefore, it will be understood that the following discussions are not intended to limit the scope of the appended claims.

With reference to FIG. 1, an energy saver system 10 is shown. The energy saver system 10 can be employed with one or more street lights 12, which can be located along one or more streets X, Y. The energy saver system 10 can be used to save energy associated with the street lights 12, and thus, can reduce operating costs associated with the street lights 12. The energy saver system 10 can control the operation of a light source 12a associated with each of the street lights 12. In this regard, as will be discussed, the energy saver system 10 can control the illumination of the light source 12a, so that in certain instances, such as when no objects, such a person P or a car C is present, the light source 12a can be dimmed or off, thereby saving energy. The light source 12a can comprise any suitable light source, such as a light bulb, gas light, plurality of LEDs, etc. The energy saver system 10 can include one or more section control systems 14 and one or more post control systems 16.

The section control systems 14 can be positioned at any desired location relative to the street lights 12, and optionally, can be positioned so that the section control systems 14 can receive data from a plurality of street lights 12. In one example, a section control system 14 can be positioned near a corner 18 so that the section control system 14 can receive data from the street lights 12 positioned along street X and street Y. Each of the section control systems 14 can be positioned adjacent to the desired street lights 12 via any suitable mechanism, such as by coupling the section control system 14 to a building, tower, post, stand, etc. In the example of FIG. 1 for instance, each section control system 14 can receive data from about four post control systems 16, which are associated with respective post control systems 16 of the street lights 12. It will be understood, however, that the section control system 14 can receive data from any number of post control systems 16, including one.

Figure 2:
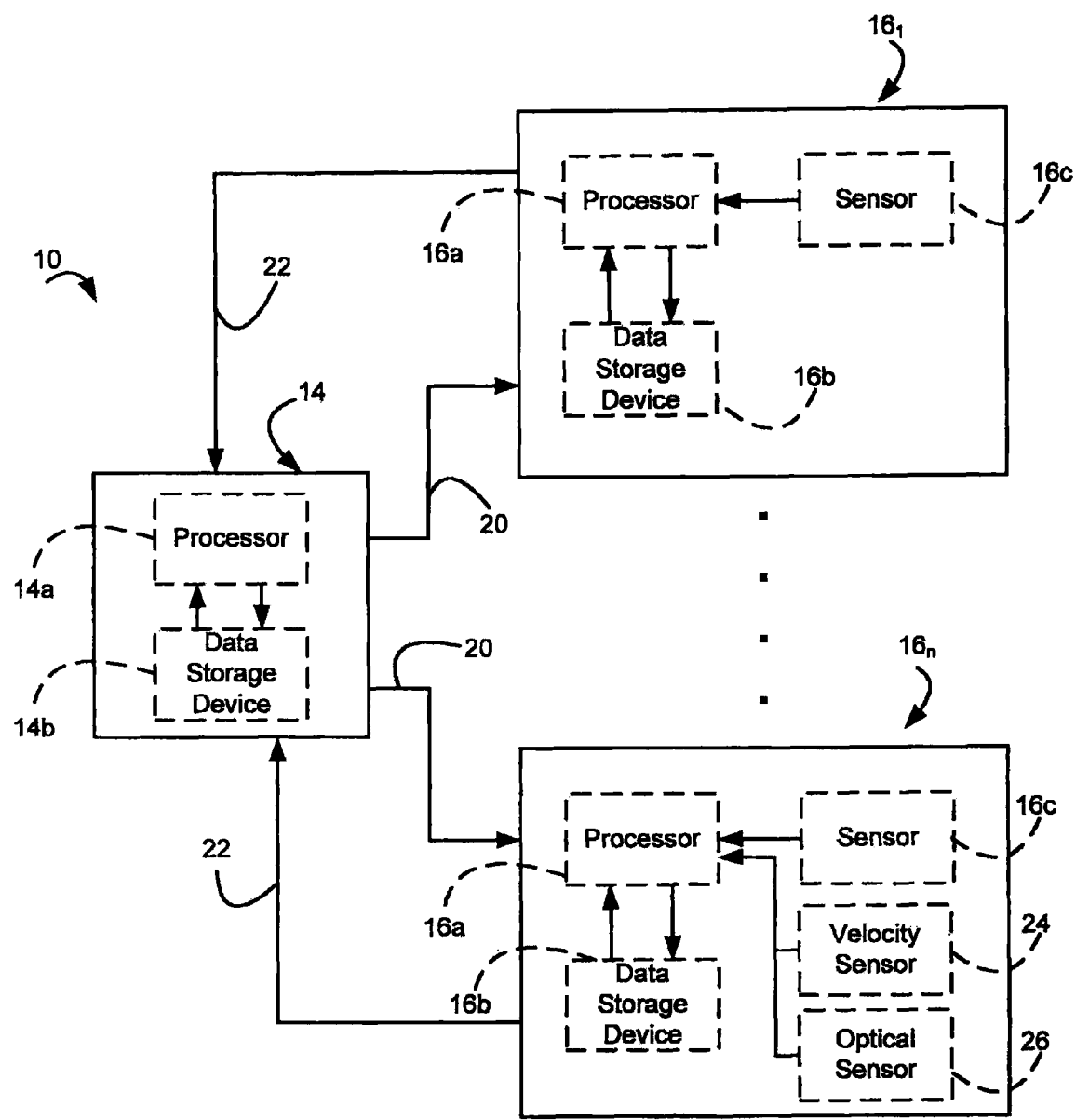
FIG. 2 is a detailed schematic illustration of the energy saver system of FIG. 1.

Generally, with reference to FIG. 2, each section control system 14 can include one or more processors 14a and one or more data storage devices 14b. The processors 14a can comprise one or more processing elements capable of implementing a control module 100. At least one of the data storage devices 14b can store one or more instructions contained in a control system associated with the control module 100. In one example, the data storage device 14b can be at least one of random access memory (RAM), read only memory (ROM), a cache, a stack, or the like, which may temporarily or permanently store electronic data.

The section control system 14 can be in communication with each post control system 16 over a suitable wireless connection 20. As suitable wireless network systems are known for the transmission of data, the wireless connection 20 will not be discussed in great detail herein. Also, it should be understood that although a wireless connection 20 is illustrated herein, the section control system 14 can communicate with the post control system 16 via any suitable communication mechanism, such as a wired connection, and further, the section control system 14 can communicate with multiple post control systems 16 through a combination of wired and wireless communication mechanisms.

With reference to FIG. 1, the post control systems 16 can be positioned at any desired location about the street lights 12, and optionally, can be positioned so that at least a portion of the post control systems 16 can face street X and street Y. In one example, a post control system 16 can be coupled to the street light 12 so that the post control system 16 can be about 30 centimeters to about 60 centimeters from a surface of a sidewalk S. Generally, each post control system 16 can be coupled to the street light 12 such that the post control system 16 can monitor the movement of objects on the respective street X or street Y. Thus, in certain instances, such as on a corner or near a street entrance, a street light 12 may include one or more post control systems 16, as illustrated. In addition, it should be noted that although the post control systems 16 are described and illustrated herein as being coupled to a street light 12, one or more of the post control systems 16 could be coupled to a post, wire, tower, stand, etc. that is adjacent to a street to control the illumination of the street lights 12 on the street. Thus, the post control system 16 as described and illustrated herein should not be limited to being coupled to a street light 12, as the post control system 16 could be positioned at any desired location relative to the street light 12 to control the street light 12. Furthermore, if desired, the post control system 16 could be integrated with the section control system 14, and the section control system 14 could be used to control the illumination of each respective street light 12.

In one example, with reference to FIG. 2, each post control system 16 can include one or more processors 16a, one or more data storage devices 16b and at least one sensor 16c. As can be appreciated, the processors 16a can comprise one or more processing elements capable of implementing a post control module 102. At least one of the data storage devices 16b can store one or more instructions contained in a control system associated with the control module 102. In one example, the data storage device 16b can be at least one of random access memory (RAM), read only memory (ROM), a cache, a stack, or the like, which may temporarily or permanently store electronic data. The sensor 16c can be any sensor that is suitable for determining if an object, such as the person P, the car C, large animals, trucks, bicyclists, motorcycles, etc., is on the street X or Y.

In this regard, as will be discussed, data from the sensor 16c can be used to determine if an object is moving on the street X, Y adjacent to or near the street light 12. In one example, the sensor 16c can comprise an infrared sensor, but the sensor 16c could comprise any suitable movement sensing device, such as a camera, infrared camera, weight sensor, radar, ultrasonic motion sensor, etc. Generally, the sensor 16c can sense in one-direction, and can be coupled to the street light 12 so that the sensor 16c can sense objects that are in the street X, Y in front of the street light 12. It should be understood that although the sensor 16c is described and illustrated herein as being a one-directional sensor, a multi-directional sensor could be employed to sense objects around or about the street light 12, such as a 360 degree sensor that could be positioned or rotatable about the street light 12. In addition, multiple sensors 16c could be employed in the post control system 16, if desired, to sense objects on either side of the street light 12, for example.

Optionally, a velocity sensor 24 can be employed with the post control system 16. If employed, the velocity sensor 24 can determine the speed of the object as it passes by the street light 12. For example, if the object is the car C, then the optional velocity sensor 24 could determine the speed of the car C. The speed of the car C could be transmitted from the post control system 16 to the section control system 14 so that the section control system 14 could decide to preemptively illuminate street lights 12 that are along the path of the object.

As another of various options, an optical sensor 26 could be employed with the post control system 16. If employed, the optical sensor 26 can determine whether the object is emitting a source of light. For example, the optical sensor 26 could determine if the object, such as a motorized vehicle (e.g. the car C), has one or more headlights H illuminated (FIG. 1). If the headlights H are illuminated, then the post control system 16 could determine to not illuminate the street light 12, or could determine to reduce the intensity of the light outputted by the street light 12 to further conserve energy.

The post control system 16 can be in communication with a respective one of the section control systems 14 over a suitable wireless connection 22. As suitable wireless network systems are known for the transmission of data, the wireless connection 22 will not be discussed in great detail herein. Also, it should be understood that although a wireless connection 22 is illustrated herein, the post control system 16 can communicate with the section control system 14 via any suitable communication mechanism, such as a wired connection.

Figure 3:
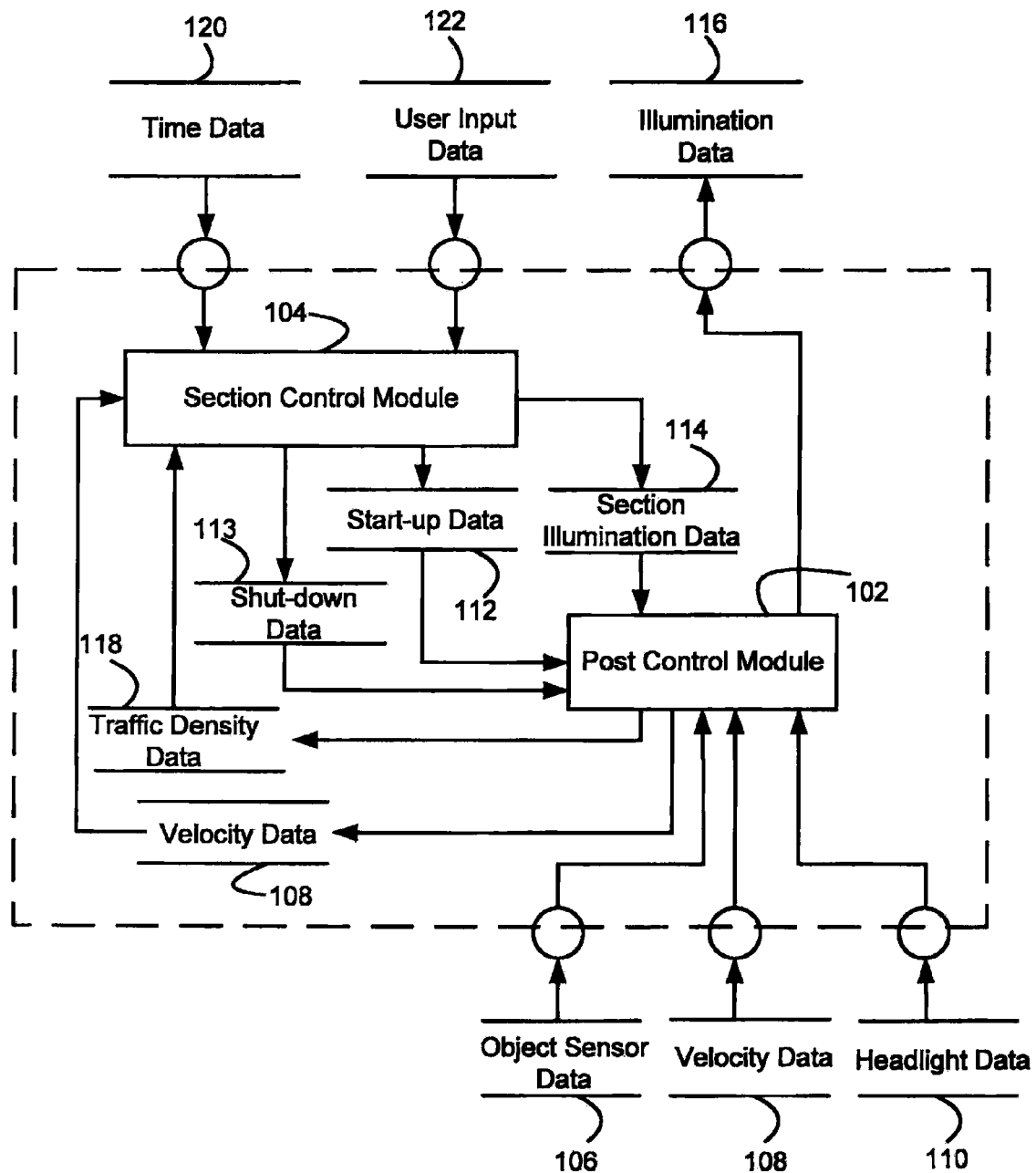
FIG. 3 shows a dataflow diagram that illustrates a control system performed by a control module associated with the energy saver system of FIG. 1.

With reference to FIG. 3, a dataflow diagram illustrates the control system that can be embedded within the control module 100. Various embodiments of the control system according to the present disclosure can include any number of sub-modules embedded within the control module 100. The sub-modules shown may be combined and/or further partitioned to similarly determine when to illuminate the street lights 12. In various embodiments, the control module 100 can include the post control module 102 and a section control module 104.

The post control module 102 can receive as input object sensor data 106, and optionally, velocity data 108 and headlight data 110. The post control module 102 can also receive start-up data 112, shut-down data 113 and section illumination data 114 as input from the section control module 104. The object sensor data 106 can comprise a signal from the sensor 16c that an object has been sensed. The velocity data 108 can comprise data from the velocity sensor 24 that indicates a velocity of the sensed object. The headlight data 110 can comprise data from the optical sensor 26, which can indicate if the sensed object has at least one active source of illumination or headlight H illuminated. The start-up data 112 can comprise a signal to activate the sensor 16c. The shut-down data 113 can comprise a signal to de-activate the sensor 16c. The section illumination data 114 can comprise a signal to illuminate the light source 12a of the street light 12.

Based on the object sensor data 106, the headlight data 110 and the section illumination data 114, the post control module 102 can output illumination data 116. The illumination data 116 can comprise a signal to illuminate the light source 12a of the street light 12 at a specified intensity. For example, the illumination data 116 can comprise a signal to illuminate the light source 12a at a full intensity or full illumination, or at a reduced intensity or dimmed illumination.

Based on the object sensor data 106, the post control module 102 can set traffic density data 118 for the section control module 104. The traffic density data 118 can comprise data that indicates that a plurality of objects have been sensed by the sensor 16c, which can indicate a high traffic condition about the respective post control module 102. The post control module 102 can also set the velocity data 108 for the section control module 104.

The section control module 104 can receive as input velocity data 108, traffic density data 118 and time data 120. Optionally, the section control module 104 can receive as input user input data 122. The time data 120 can comprise a start time for the start-up data 112. In one of various examples, the section control system 14 can include an internal clock, so that given the time data 120, the section control system 14 can set the start-up data 112 for the post control module 102 at the time specified in the time data 120. The time data 120 can be received from one of various data storage devices 14b associated with the section control system 14, or could be provided as input through a user input device in communication with the section control module 104, such as a handheld communication device. The optional user input data 122 can comprise instructions for the setting of the section illumination data 114 and/or the setting of the start-up data 112, which can be input through a user input device in communication with the section control module 104. Based on the velocity data 108, the traffic density data 118, the time data 120 and the user input data 122, the section control module 104 can set the start-up data 112, the shut-down data 113 and the section illumination data 114 for the post control module 102.

Figure 4:
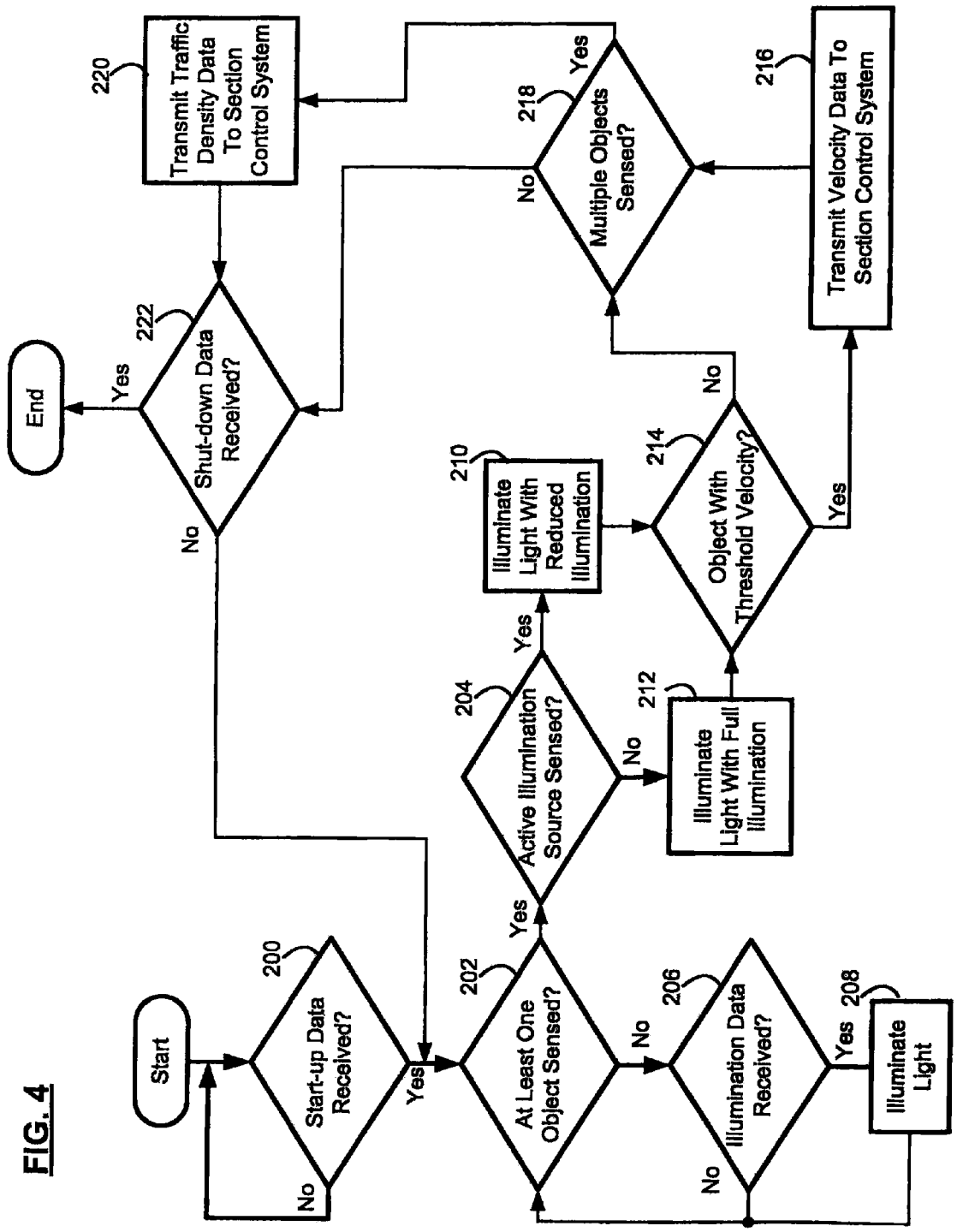
FIG. 4 shows an example flowchart diagram that illustrates one of various control methods performed by the control module of FIG. 2.

With reference now to FIG. 4, a flowchart diagram illustrates a method performed by the post control module 102. In block 200, the method can determine if the start-up data 112 has been received. If the start-up data 112 has not been received, then the method can loop until the start-up data 112 has been received.

If the start-up data 112 has been received, then the method can go to block 202. At block 202 the method can determine if at least one object has been sensed by the sensor 16c. If at least one object has been sensed, then the method can go to block 204. Otherwise, at block 206, the method can determine if section illumination data 114 has been received from the section control module 104. If section illumination data 114 has been received, then the method can go to block 208. Otherwise, the method can loop to block 202. At block 208, the method can illuminate the light source 12a based on the section illumination data 114. For example, if the section illumination data 114 comprises a signal to illuminate the light source 12a at full intensity, the method can perform this at block 208. Then, the method can go to block 202.

At block 204, the method can determine if the headlight data 110 indicates that at least one headlight H is illuminated. If at least one headlight H is illuminated, then the method can go to block 210. Otherwise, the method can go to block 214.

At block 210, the method can illuminate the light source 12a at a reduced intensity or dimmed illumination, or optionally, can not illuminate the light source 12a. Then, the method can go to block 212.

At block 212, the method can determine to illuminate the light source 12a at a full intensity or full illumination. Next, at block 214, the method can determine if an object has a velocity that exceeds a threshold, based on the velocity data 108 received from the optional velocity sensor 24. For example, the threshold could comprise a velocity associated with a moving car, such as 10 kilometers per hour (km/h). If the object has a velocity that exceeds the threshold, then the method can go to block 216. Otherwise, the method can go to block 218.

At block 216, the method can transmit the velocity data 108 to the section control system 14. At block 218, the method can determine if multiple objects have been sensed by the sensor 16c. If multiple objects have been sensed by the sensor 16c, then the method can go to block 220. Otherwise, the method can go to block 222.

At block 220, the method can transmit the traffic density data 118 to the section control system 14. Then, at block 222, the method can determine if shut-down data 113 has been received from the section control system 14. If shut-down data 113 has not been received, then the method can loop to block 202. Otherwise, the method can end.

Figure 5:
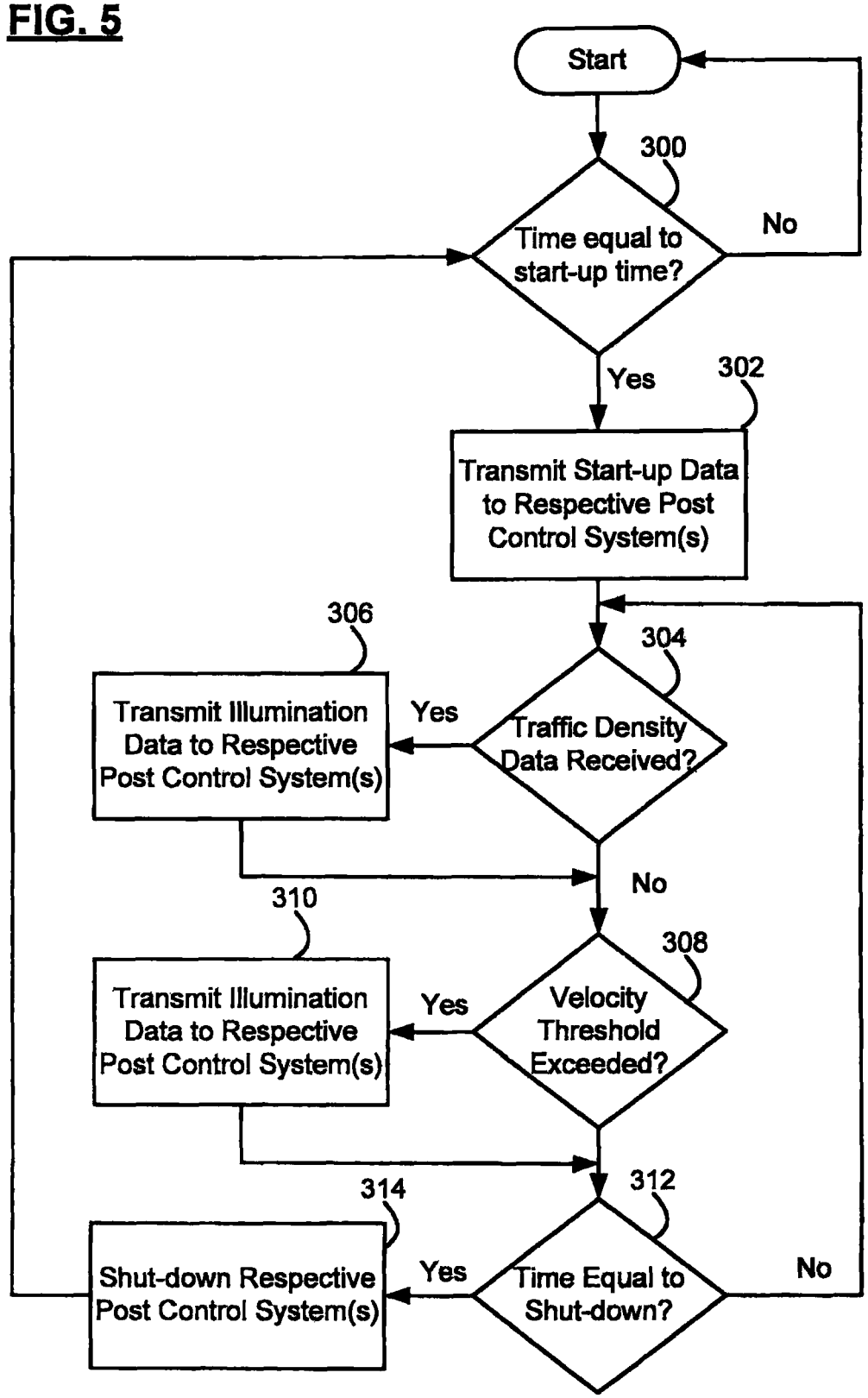
FIG. 5 shows an example flowchart diagram that illustrates one of various control methods performed by the control module of FIG. 2.

With reference now to FIG. 5, a flowchart diagram illustrates a method performed by the section control module 104. At block 300, the method can determine if the time, based on the time data 120, is equal to the start-up time for the respective sensor(s) 16c. If the time is equal to the start-up time, then the method can go to block 302. Otherwise, the method can loop until the appropriate start-up time.

At block 302, the method can transmit the start-up data 112 to the post control system 16. Then, at block 304, the method can determine if traffic density data 118 has been received, which would indicate that there is heavy traffic in the area about the respective street light(s) 12. If traffic is heavy, the method can go to block 306, at which the method can transmit section illumination data 114 to the respective post control system(s) 16. For example, the section illumination data 114 for heavy traffic can comprise a full intensity or full illumination signal. Otherwise, if traffic is not heavy, such that traffic density data 118 has not been received, then the method can go to block 308.

At block 308, the method can determine if velocity data 108 has been received from one of the post control system(s) 16. If velocity data 108 has been received, then the method can go to block 310. Otherwise, the method can go to block 312.

At block 310, the method can transmit section illumination data 114 to the respective post control system(s) 16. In one example, the section illumination data 114 for a threshold velocity object can comprise a full intensity or full illumination signal for each post control system 16 located along the respective street X, Y.

At block 312, the method can determine if the time is equal to a shut-down time for the energy saver system 10. For example, if the time is such that daylight can illuminate the street X, Y. If the time is not equal to a shut-down time for the energy saver system 10, then the method can loop to block 304. Otherwise, at block 314, the method can transmit shut-down data 113 to the respective post control system(s) 16. Then, the method can loop to block 300.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

For example, while the energy saver system 10 has been described as controlling the illumination of street lights 12, those of skill in the art will appreciate that the present disclosure, in its broadest aspects, may be constructed somewhat differently. For example, the energy saver system 10 could be employed to control the illumination of traffic signals. In this regard, for example, if a post control system 16 adjacent to a traffic signal indicates that no traffic is present, then the traffic signal can be switched off, which can provide additional energy and cost savings.

The invention claimed is:

1. A method to save energy, comprising:
   providing an object sensor coupled to a light source;
   sensing whether an object is adjacent to the light source;
   determining whether a time of day corresponds to a particular start-up time;
   determining whether the object includes an active source of illumination; and
   illuminating the light source when the time of day corresponds to the particular start-up time, the object is adjacent to the light source, and the object does not include the active source of illumination.

2. The method of claim 1, wherein illuminating the light source comprises: illuminating a light source that is coupled to a street light.

3. The method of claim 1, wherein the sensing the object includes sensing at least one human, animal, motorized vehicle or combinations thereof.

4. A method to save energy, comprising:
   providing an object sensor coupled to a light source, including providing a street light that includes the object sensor;

sensing whether the object is adjacent to the light source, including sensing that the object is adjacent to the street light;

determining time of day corresponds to a particular start-up time; and illuminating the light source when the time of day corresponds to the particular start-up time and the object is adjacent to the light source, wherein illuminating the light source includes illuminating the street light based on the sensing of the object and the time of day.

5. The method of claim 4, further comprising:

determining a velocity of the object;

determining whether the velocity of the object is greater than a particular threshold; and illuminating another street light when the velocity is greater than the particular threshold.

6. The method of claim 5, wherein illuminating the another street light includes:

sensing the object in a street adjacent to street light; and illuminating the another street light along the adjacent street.

7. The method of claim 4, wherein illuminating street light includes:

determining that the object is adjacent to the street light; and illuminating another street light.

8. The method of claim 7, wherein the illuminating the another street light includes:

determining that the object is in a street adjacent to the street light; and illuminating the another street light along the adjacent street.

9. A system to save energy, comprising:

an object sensor, coupled to a street light, that senses a presence of at least one object;

a control system, including:
 a section control system configured to:
  transmit a signal to activate the object sensor based on a selected time,
  determine, based on the presence of the at least one object, whether to illuminate an area around the object sensor, and
  transmit the signal to illuminate a plurality of street lights; and a post control system, associated with the street light and the object sensor, configured to receive the transmitted signal and illuminate the street light.

10. The system of claim 9, wherein the object sensor includes an infrared sensor, an infrared camera, a camera or combinations thereof.

11. The system of claim 10, wherein the section control system is configured to communicate with the post control system over a wireless link.

12. The system of claim 11, wherein the post control system includes a velocity sensor configured to sense a velocity of the at least one object as it moves relative to the street light.

13. The system of claim 12, wherein the section control system is configured to transmit a signal to illuminate another street light based on the velocity of the at least one object.

14. The system of claim 11, wherein the post control system includes an optical sensor configured to sense whether the at least one object includes an active illumination source.

15. The system of claim 14, wherein when the at least one object includes the active illumination source, the post control system is configured to not illuminate the street light.

16. The system of claim 14, wherein when the at least one object includes the active illumination source, the post control system is configured to illuminate the street light to an illumination less than full illumination.

17. A system to save energy, comprising:

an object sensor configured to sense a presence of an object; and a control system configured to determine, based on the presence of the object, whether to illuminate an area around the object sensor, the control system including:
 a section control system configured to:
  transmit a signal to activate the object sensor based on a selected time, and
  transmit a signal to illuminate a street light.

18. The system of claim 17, wherein the section control system is configured to communicate with a post control system over a wireless link.

19. The system of claim 18, wherein the post control system includes a velocity sensor configured to sense a velocity of the object moving relative to the street light.

20. The system of claim 19, wherein the section control system is further configured to transmit a signal to illuminate another street light based on the velocity of the object.

21. The system of claim 18, wherein the post control system includes an optical sensor configured to sense whether the object includes an active illumination source.

22. The system of claim 21, wherein when the object includes the active illumination source, the post control system is configured to not illuminate a light source of the street light.

23. The system of claim 21, wherein when the object includes the active illumination source, the post control system is configured to illuminate a light source of the street light to an illumination less than full illumination.

* * * * *

UNITED STATES PATENT AND TRADEMARK OFFICE
CERTIFICATE OF CORRECTION

| | | |
|---|---|---|
| PATENT NO. | : 8,587,222 B2 | Page 1 of 1 |
| APPLICATION NO. | : 12/550473 | |
| DATED | : November 19, 2013 | |
| INVENTOR(S) | : Amutham | |

It is certified that error appears in the above-identified patent and that said Letters Patent is hereby corrected as shown below:

In the Specification

In Column 1, Line 3, delete "APPLICATIONS" and insert -- APPLICATION --, therefor.

In the Claims

In Column 9, Line 4, in Claim 4, delete "determining time" and insert -- determining whether a time --, therefor.

Signed and Sealed this
Twentieth Day of May, 2014

Michelle K. Lee
*Deputy Director of the United States Patent and Trademark Office*